Figure 2:
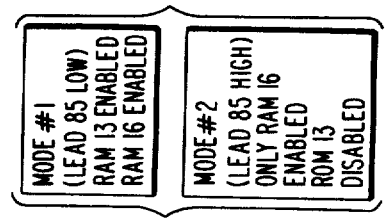

United States Patent [19]

Oberman

[11] 4,450,524
[45] May 22, 1984

[54] SINGLE CHIP MICROCOMPUTER WITH EXTERNAL DECODER AND MEMORY AND INTERNAL LOGIC FOR DISABLING THE ROM AND RELOCATING THE RAM

[75] Inventor: Joel R. Oberman, Somerville, N.J.

[73] Assignee: RCA Corporation, New York, N.Y.

[21] Appl. No.: 304,785

[22] Filed: Sep. 23, 1981

[51] Int. Cl.³ .............................................. G06F 13/00
[52] U.S. Cl. ................................................. 364/200
[58] Field of Search ............................ 364/200, 900

[56] References Cited

U.S. PATENT DOCUMENTS

| | | |
|---|---|---|
| 3,693,159 | 9/1972 | Hilberg . |
| 3,771,143 | 11/1973 | Taylor . |
| 3,781,826 | 12/1973 | Beausoleil . |
| 3,813,650 | 5/1974 | Hunter . |
| 3,845,476 | 10/1974 | Boehm . |
| 3,882,470 | 5/1975 | Hunter . |
| 3,897,626 | 8/1975 | Beausoleil . |
| 3,917,933 | 11/1975 | Scheuneman . |
| 3,934,227 | 1/1976 | Worst . |
| 4,047,163 | 9/1977 | Choate et al. . |
| 4,051,460 | 9/1977 | Yamada et al. . |
| 4,112,502 | 9/1978 | Scheuneman . |
| 4,153,933 | 5/1979 | Blume, Jr. et al. ............ 364/200 |

*Primary Examiner*—Raulfe B. Zache
*Attorney, Agent, or Firm*—J. S. Tripoli; R. L. Troike; D. W. Phillion

[57] ABSTRACT

A data processor system having a total memory capacity, an integrated circuit chip having thereon a central processing unit (CPU), a ROM, a RAM, a first decoder responsive to addresses supplied thereto for determining the location of the RAM in the total memory capacity, and logic for disabling the ROM from the CPU and for relocating the RAM in the total memory capacity. Also provided are a generator for generating a first control signal having first and second states, first gating logic responsive to the first state of the control signal to disable the ROM and to disconnect the output of the first decoder from the RAM. Further provided is an adjustable second decoder positioned externally of the chip and responsive to addresses supplied thereto from the CPU to generate an output signal defining a selectable location of the RAM in the total memory capacity, and second gating logic responsive to the first state of the control signal to connect the output signal of the adjustable second decoder to the RAM to thereby define the selectable location of the RAM in the total memory capacity.

6 Claims, 2 Drawing Figures

SINGLE CHIP MICROCOMPUTER WITH EXTERNAL DECODER AND MEMORY AND INTERNAL LOGIC FOR DISABLING THE ROM AND RELOCATING THE RAM

This invention relates to a microcomputer memory control and more particularly, to those internal adaptation of the RAM and ROM memory portions of a microcomputer which are all located on the same integrated circuit chip when the system is employed in various applications or when, for any reason, the internal ROM has become useless.

Microcomputers today are usually manufactured on a single chip which includes an internal read only memory (ROM) and an internal random access memory (RAM). In a sixteen bit microcomputer, for example, there are $2^{16}$ or 65,536 total possible memory locations if the entire memory capacity of the equipment were employed. Both the internal RAM and the internal ROM of the system (i.e., that portion of the total RAM and ROM located on the same chip as the microprocessor) are ordinarily located at some defined location in the 65,536 possible locations of the total memory by means of an output signal from a decoder means which responds to addresses usually supplied from the central processing unit (CPU) to output a signal when the starting location of the internal RAM or ROM block of memories begins and continuing such an output signal until the end of the internal RAM or ROM block of memory locations. Thus, for example, if the internal RAM has a capacity of 64 addresses it would then be possible to define the starting address of the internal RAM as location 32,768 and to continue enablement of the internal RAM for 64 additional word locations, thereby providing access to all 64 memory locations in the RAM. The locating of the internal RAM in main memory is effected by the higher bits of the generated addresses and, in the example discussed above, would require the 10 higher address bits. The 6 lower address bits define each of the 64 ($2^6$) specific and consecutive address locations of the RAM in main memory.

An attendant problem with the foregoing is that it is virtually impossible to change the location of RAM in main memory once it has been manufactured into the chip largely because of the very small size of the components on the chip. Similarly, the location of the ROM in main memory is fixed. Further, because of the nature of most ROM's it is not possible to change the programs resident therein. Ordinarily, ROM's on the chip are manufactured to meet the needs of a particular customer and will accordingly have particular programs resident in the ROM. However, should the customer decide to use his processing system for some other application, then the resident programs in ROM will very likely become obsolete and useless. In such a case, external memory, which could be ROM, must be substituted for the internal ROM.

Furthermore, a user might decide that the particular location of the RAM in total main memory is not suitable for his purposes so it becomes desirable to him that the location of the RAM in total memory be changeable.

A further problem sometimes arises in manufacturing overruns of microcomputers having ROM's and RAM's resident on the chip. The programs in the ROM's are usually of no use to an alternative vendee and again the change of location of the RAM becomes desirable, particularly in those cases where the vendee might become uncertain as to the location of the internal RAM and assign conflicting external memory locations.

In a preferred embodiment of the invention there is provided, in combination with a data processing system having a total memory capacity of $2^R = X$ word locations, where R is the memory address length, and further having, on a single chip, a CPU, a RAM having M memory locations, a ROM having N memory locations, where $M + N \leq X$, an address bus extendable externally off the chip, and addressing logic for determining the location of the ROM and RAM in total memory capacity with the addressing logic comprising first and second decoders responsive to addresses supplied thereto on the address bus to enable the ROM and the RAM, other logic for disabling the ROM, adding off chip memory, and for changing the location of RAM in total memory capacity and comprising an off chip memory, an off chip third decoder responsive to first and second addresses appearing on the externally extendable address bus to generate first and second decoded output signals, and an off chip control signal source for generating a first control signal. Also provided is control logic responsive to the first control signal to substitute the first decoded output signal of the third decoder for the output of the second decoder as the enabling signal for the RAM, to disable the ROM, and to generate a second signal to disable the off chip memory when the RAM is enabled.

Figure 1:
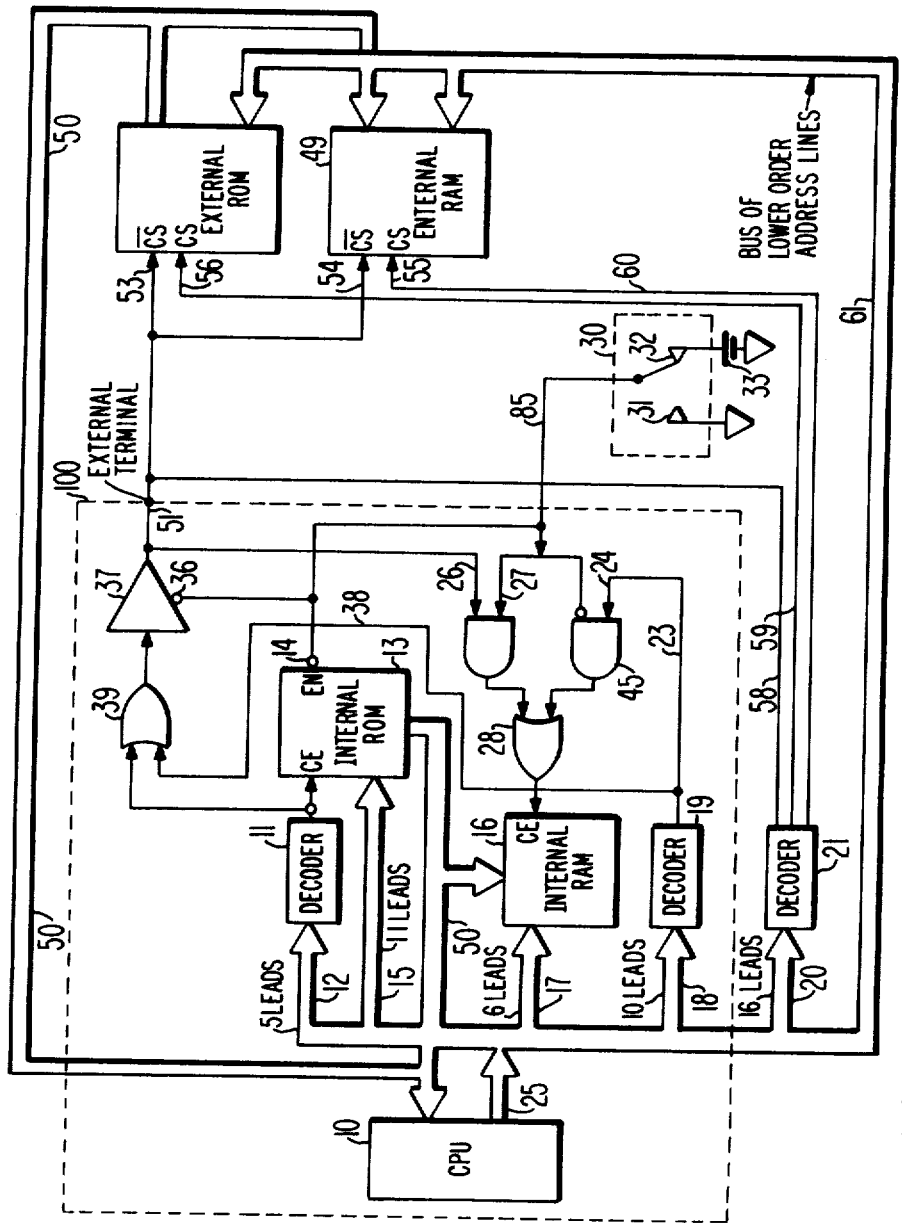

In the drawings:

FIG. 1 shows a microcomputer system with the portions thereof within the dashed rectangle 100 being located on an integrated circuit and the portions outside the dashed rectangle 100 being external of the chip; and FIG. 2 shows the two modes of operation of the circuit.

The CPU 10 supplies 16 bit addresses to an address bus 25 which are employed to access word locations in the memory locations in the internal ROM 13 and the internal RAM 16. More specifically, 6 leads carrying the 6 lower order address bits are supplied to the internal RAM 16 which defines 64 address locations since $2^6 = 64$. The particular word locations in the 65,536 total memory address locations which the 64 RAM word locations occupy is determined by the output of decoder 19 to which the 10 leads carrying the 10 higher order address bits are supplied from CPU 10. The output of the decoder 19 is a pulse that will occur at some point during the total 65,536 address locations, depending on the construction of deocoder 19 and will have a duration defining the accessing of 64 word locations. The output of decoder 19 is supplied to input 24 of AND gate 45 and when AND gate 45 is primed, therethrough, and then through OR gate 28 to the chip enable (CE) input of the internal RAM 16. The CPU will then access the 64 word locations of internal RAM 16.

The decoder 11 responds to the 5 higher order address bits supplied thereto from bus 25 to enable the internal ROM 13 at the beginning of the location in main memory defined by said 5 higher order bits. The ROM 13 responds to the 11 lower order address bit on 11 lead bus 15 to access any one of its 2,048 ($2^{11}$) possible addresses. The bus 50 which extends throughout the drawing between CPU 10, RAM 16, external ROM 48, and RAM 49, is the data bus.

When both the internal ROM 13 and the internal RAM 16 are being utilized (Mode #1 as shown in FIG. 2) a control signal appearing on input lead 85 causes both the internal ROM and the internal RAM to be energized. Specifically, if switch 30 is closed upon contact 31, a low level ground signal is supplied to inhibit input 25 of AND gate 45. This primes the AND gate 45 so that RAM 16 is enabled by an output from decoder 19. Also, when switch 30 is closed, the low level ground signal is also supplied to the enable input of internal ROM 13, thereby enabling the ROM 13 and also to the control input 36 of tri-state device 37, thereby enabling tri-state device 37. The purpose of tri-state 37 is to supply the output of OR gate 39 therethrough and then to the chip select inputs 53 ($\overline{CS}$) and 54 ($\overline{CS}$) of external ROM 48 and external RAM 49 to indicate whether either internal ROM 13 or internal RAM 16 is being accessed.

The foregoing conditions (when ground is applied to control lead 85) is identified herein as the mode 1 of operation of the system and is shown in the chart of FIG. 2. OR gate 39 produces a low level output when neither the internal ROM 13 or the internal RAM 16 are being accessed. More specifically, the outputs of decoders 11 and 19 are supplied to the two inputs of OR gate 39. If neither of decoder 11 or decoder 19 is generating a high level signal then neither ROM 13 or RAM 16 is being accessed and a low level signal appears on the output of OR gate 39.

Since the system cannot access two memory locations simultaneously, it is necessary to disable external memories 48 and 49 when an internal memory is being accessed. This is accomplished by supplying the high level outputs of either decoders 11 or decoder 19 to the inputs of OR gate 39 which will then supply a high level signal through energized tri-state device 37 and to the two chip select terminals 53 ($\overline{CS}$) and 54 ($\overline{CS}$) of external memories 48 and 49, respectively. Such high level signal supplied to chip select inputs 53 and 54 will disable the external memories 48 and 49.

As indicated above, the particular memory of external memories 48 or 49 which is selected when an external memory is to be used is determined by the signals supplied to the chip select inputs 56 (CS) and 55 (CS) of external memories 48 and 49. The two chip select terminals of each of the two memories ROM 48 and RAM 49 act as an AND gate and it is necessary that the proper level signals be supplied to both chip select inputs of a particular memory in order to enable that particular memory.

Assume now that internal ROM 13 becomes useless because the user wants to use the processor in a different application requiring different ROM programs (Mode #2 of FIG. 2). He might also then wish to change the location of the internal RAM 16 block of addresses in the overall memory scheme. The foregoing can be accomplished by switching the switch 30 to voltage level 33 which is a high level signal and will be supplied via lead 85 to inhibit input 14 of internal ROM 13 thereby inhibiting said ROM 13, to control input 36 of tri-state device 37 thereby inhibiting tri-state device 37, and to inhibiting input 25 of AND gate 45, thereby disabling AND gate 45. However, such high level signal will also be supplied to input 27 of AND gate 46 thereby priming said AND gate 46 and permitting the output of decoder 21 to be conducted through lead 58, lead 51, and then to pass through AND gate 46 and OR gate 28 to the chip enable input CE of internal RAM 16. The decoder 21 is constructed in such a manner that the signal appearing on its output lead 58 is in response to the same 10 leads that are supplied to the address decoder 19 and functions to decode such 10 leads to locate the block of RAM word locations whenever the user desired, since decoder 21 is external of the chip and can be adjusted.

The output of decoder 21 is also connected via lead 58 to chip select inputs 53 ($\overline{CS}$) and 54 ($\overline{CS}$) of external memories 48 and 49 and performs the same function as the output of tri-state device 37 in that it informs ROM's 48 and 49 that internal RAM 16 is being accessed and that external memories 48 and 49 cannot also be accessed. As indicated above, the signals appearing on output leads 59 and 60 of decoder 21 go respectively to chip select input terminal 56 (CS) of external ROM 48 and to chip select input terminal 55 (CS) of external RAM 49 and define the starting point of the block of memory locations contained in external memories 48 and 49. The bus 61 is supplied directly to external memories 48 and 49 from address bus 25 of CPU 10 and contains the lower order bits which are employed to either step through or randomly access each of the memory locations contained in ROM 48 or RAM 49 when they are energized to be accessed.

What is claimed is:

1. In a data processor system having a total memory capacity and including an integrated circuit chip having a central processing unit (CPU), an internal ROM, an internal RAM, and first decoder means formed thereon with said first decoder means responsive to addresses supplied thereto for determining the location of said internal RAM in said total memory capacity, means for disabling said internal ROM from said CPU and for relocating said internal RAM in said total memory capacity and comprising:

means for generating a first control signal having a first and a second state;

said internal ROM reponsive to the first state of said first control signal to become disabled;

first means including first gating means responsive to the first state of said first control signal to disable said internal ROM and to disconnect the output of said first decoder means from said internal RAM;

a second decoder means positioned externally of said chip and responsive to predetermined addresses supplied thereto from said CPU to generate an enabling output signal selectively defining a location of said internal RAM in said total memory capacity;

means for supplying said predetermined addresses from said CPU to said second decoder means; and second means including second gating means responsive to the first state of said first control signal to supply the enabling output signal of said second decoder means to said internal RAM to define the location of said internal RAM in said total memory capacity.

2. In a data processor system as in claim 1 in which said second gating means is responsive to the second state of said first control signal to substitute the output of said first decoder means for the enabling output signal of said second decoder means as the enabling signal for said internal RAM, to enable said internal ROM, and to generate a second control signal when either said internal ROM or said internal RAM is enabled;

a normally enabled external memory means responsive to said second control signal to become disabled for the duration of said second control signal;

said external memory comprising read/write logic and responsive, when enabled, to said output of said second decoder means to access selectable memory locations of said external memory.

3. In a data processing system having a total memory capacity of $2^R = X$ word locations, where $R =$ the address length of the, word locations and comprising, on a single chip, a CPU, an internal RAM having a first block of M memory locations, an internal ROM having a second block of N memory locations where $M + N \leq 2^R = X$ and means for determining the location of said first and second blocks of memory locations of said internal ROM and said internal RAM in said total memory capacity, and comprising an address bus extendable externally off said chip and first and second decoder means located on said chip and responsive to addresses supplied thereto on said extendable address bus to supply enabling signals to said internal ROM and said internal RAM, a ROM disabling and substitution means comprising:

a memory means located externally of said chip;

a third decoder means positioned external of said chip and responsive to a first address and to a second address appearing on said externally extendable address bus to generate first and second decoded output signals;

a control signal source located externally of said chip for generating a control signal having first and second states;

an externally connectable terminal located on said chip and connected to the first decoded output signal of said third decoder means; and control gating logic located on said chip and responsive to the first stage of said control signal to substitute the first decoded output signal of said third decoder means for the output of said second decoder means as the enabling signal for said internal RAM and to disable said internal ROM;

said external memory means comprising logic responsive to the first decoded output signal of said third decoder means to become disabled when said internal RAM is enabled and to the second decoded output of said third decoder means to become enabled when said internal RAM is disabled.

4. In a data processing system as in claim 3 and in which said control gating logic is further responsive to the second state of said first control signal to substitute the output of said second decoder means for the output of said third decoder means as the enabling signal for said internal RAM, to enable said internal ROM, and to supply a third control signal to said external terminal when either said internal ROM or said internal RAM is enabled;

said external memory means responsive to said third control signal to become disabled during the duration of said third control signal;

said external memory means comprising read/write logic responsive to addresses appearing on said extendable data bus and to the concurrently occurring second decoded output signal of said third decoder means to access selectable memory locations therein.

5. In a data system having a total memory capacity of X memory locations and comprising, on a single chip, an internal RAM having an enable input and a first block of M memory locations, where $M < X$, an address bus extendable externally off said chip, means for generating addresses, and first decoding means responsive to higher order address bits defining a given block of addresses in said total memory capacity to generate and supply a first enable signal to the enable input of said internal RAM, and a terminal on said chip connectable to a lead external to said chip, logic for changing the location of said first block of M memory locations in said total memory capacity and comprising:

second decoding means external to said chip and responsive to addresses on said extendable address bus to generate a second enable signal defining a selectable location for said block of M memory locations in said total memory capacity; and means external to said chip for generating and supplying a control signal to said terminal via an external lead; and logic means located on said chip and responsive to said control signal to disconnect the first enable signal of said first decoder means from the enable input of said internal RAM and to connect the second enable signal of said second decoding means to the enable input of said internal RAM.

6. In a data processor system having a total memory capacity of X memory locations and comprising on a single integrated circuit chip a CPU, an internal ROM having enabling and disabling input means and a first block of M word locations, an internal RAM having enabling and disabling input means and a second block of N word locations, an address bus for receiving addresses from said CPU and extendable externally off said chip, and first and second decoding means for defining the location of said first and second blocks of word locations in said total memory capacity, an external memory located externally of said chip, third decoding means positioned externally of said chip and responsive to addresses supplied from said externally extendable address bus to generate a decoded signal, a control circuit located on said chip for disabling said internal ROM and placing the determination of the location in said total memory capacity of said second block of word locations of said internal RAM under the control of said third, external decoding means, and comprising:

a control signal source external of said chip for generating a control signal;

first gating means located on said chip and responsive to said control signal to disconnect the output of said second decoding means from the enabling input means of said internal RAM; and second gating means located on said chip and responsive to said control signal to supply the decoded signal of said third external decoding means to said enabling input means of said internal RAM to enable said internal RAM;

said internal ROM responsive to said control signal to become disabled;

said external memory responsive to said decoded signal of said third decoder means to become disabled.

* * * * *